United States Patent
Benham

(10) Patent No.: US 7,336,404 B2
(45) Date of Patent: Feb. 26, 2008

(54) METHOD AND APPARATUS FOR SCANNING IRREGULAR SHAPED DOCUMENT

(75) Inventor: Todd D. Benham, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 1065 days.

(21) Appl. No.: 10/633,777

(22) Filed: Aug. 4, 2003

(65) Prior Publication Data

US 2005/0030597 A1    Feb. 10, 2005

(51) Int. Cl.
   *H04N 1/04*    (2006.01)
   *B65H 3/06*    (2006.01)

(52) U.S. Cl. .............. 358/488; 358/474; 358/497; 271/117

(58) Field of Classification Search .......... 358/488, 358/474, 497, 496; 250/208.1; 271/117, 271/157
See application file for complete search history.

(56) References Cited

U.S. PATENT DOCUMENTS

| 5,568,573 | A | 10/1996 | Wada et al. |
| 5,946,527 | A | 8/1999 | Salgado et al. |
| 6,283,471 | B1 | 9/2001 | Kunzel et al. |
| 2003/0066129 | A1* | 4/2003 | Hsia ............... 5/99.1 |
| 2003/0086129 | A1* | 5/2003 | Tesavis et al. ....... 358/488 |
| 2004/0070798 | A1* | 4/2004 | Andersen et al. ..... 358/498 |

FOREIGN PATENT DOCUMENTS

EP    1 311 106 A1    5/2003

* cited by examiner

*Primary Examiner*—Houshang Safaipour
(74) *Attorney, Agent, or Firm*—Nelson Adrian Blish

(57) ABSTRACT

A scanner (30) comprises a transport mechanism (6) for moving a document (12) and a sensor (2) for detecting a leading edge (31) and trailing edge (32) of the document. A camera (16, 17) scans the document (12), detecting the leading edge (31) and a trailing edge (32) of the document. A controller (10) receives a signal from the camera (16, 17) when the camera detects the document in a field of the camera and receives a signal from the sensor (2) when the sensor detects the document (12) in a field of the sensor. The controller starts image capture when a leading edge (31) of the document is detected by either the sensor (2) or the camera (16, 17), and stops image capture when a trailing edge (32) of the document is detected by either the sensor or the camera (16, 17). The drive mechanism (5) is turned off when a leading edge (31) of the document is detected by either the sensor or the camera, and starts when a trailing edge (32) of the document is detected by both the sensor (2) or the camera (16, 17).

13 Claims, 4 Drawing Sheets

METHOD AND APPARATUS FOR SCANNING IRREGULAR SHAPED DOCUMENT

CROSS REFERENCE TO RELATED APPLICATIONS

Reference is made to commonly-assigned copending U.S. patent application Ser. No. 10/036,587, filed Nov. 7, 2001, entitled SCAN MODULE CCD USED AS MACHINE CONTROL SENSOR, by Tesavis et al., the disclosure of which is incorporated herein.

FIELD OF THE INVENTION

This invention relates to scanning documents with holes, cutouts, perforations, and similar abnormalities using an automatic document feeder on a production scanner.

BACKGROUND OF THE INVENTION

Current production scanners with an automatic document feeder limit the types of documents that can be fed and imaged correctly. For example, if a document has a hole or tear, it may jam or cause multiple images when a single image is desired. Also, if a document has a cutout, making an "L" shaped document, current production scanners often feed the next document too early resulting in a truncated part of the document in the image or including part of the next document in the current image. In another example, a document with perforations, typically on a edge of the document, confuse sensors and processor algorithms and may cause a jam condition. Also, documents fed at extreme angles normally result in images missing part of the document such as truncated corners. A similar result would occur for triangular or folded documents. These kinds of document feed problems cause malfunctions of automatic document scanners.

Prior art attempts to solve these problems have included use of multiple sensors to detect the leading edge or the trailing edge of documents passing through the scanner. These sensors may be located in a line so that if any of the sensors detect an edge of a document, even if the document is tilted, a controller for the scanner starts image capture and turns off the transport feed mechanism. Multiple sensors, however, add to the cost of the scanner. It would be advantageous to minimize the number of sensors used for document detection and at the same time compensate for document cutouts, holes, and other problems described above.

SUMMARY OF THE INVENTION

Briefly, according to one aspect of the present invention a scanner comprises a transport mechanism for moving a document and a sensor for detecting a leading edge and trailing edge of the document. A camera scans the document, detecting a leading edge and a trailing edge of the document. A controller receives a digital signal from the camera when the camera detects the document in a field of the camera and receives a digital signal from the sensor when the sensor detects the document in a field of the sensor. The controller starts image capture when a leading edge of the document is detected by either the sensor or the camera, and stops image capture when a trailing edge of the document is detected by either the sensor or the camera The drive mechanism is turned off when a leading edge of the document is detected by either the sensor or the camera, and starts a drive mechanism when a trailing edge of the document is detected by either the sensor or the camera.

In one embodiment, feeding and scanning of documents with abnormal features such as holes, cutouts, ruffled edges, extreme skew, off-center, is accomplished using a single sensor and the camera for document detection. The camera in conjunction with the ultrasonic paper sensor is used to detect the beginning or the end of a page all the way across the width of paper path. This is akin to having multiple sensors across the width of the transport. If a page can be transported (fed), it can be scanned.

The present invention solves the problem of documents with, for example, a hole in the center of a page. A scanner usually processes this as two documents or a jam condition. By using the camera page detection, the image could be captured as one image. This could handle any number of holes in the document as long as the document can still be fed and transported.

Another problem solved is checks fed at a 45-degree angle. Normally a scanner truncates the corners in the image based on where the check passes under the ultrasonic paper sensor. In the present invention the camera detects the entire width of the paper path and the entire document can be captured without any truncation.

Another problem solved by the present invention is a page with a cutout such as a document with a warranty card removed. A scanner is likely to truncate part of the image beyond the first cut point that passes under a single ultrasonic paper sensor. According to the present invention, the camera can detect and capture the extra part.

Thus, according to the present invention nearly any document can be captured if it can be fed and transported. This includes round, oval, diamond, and even paper cut into shapes such as an animal or a person.

The invention and its objects and advantages will become more apparent in the detailed description of the preferred embodiment presented below.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1:
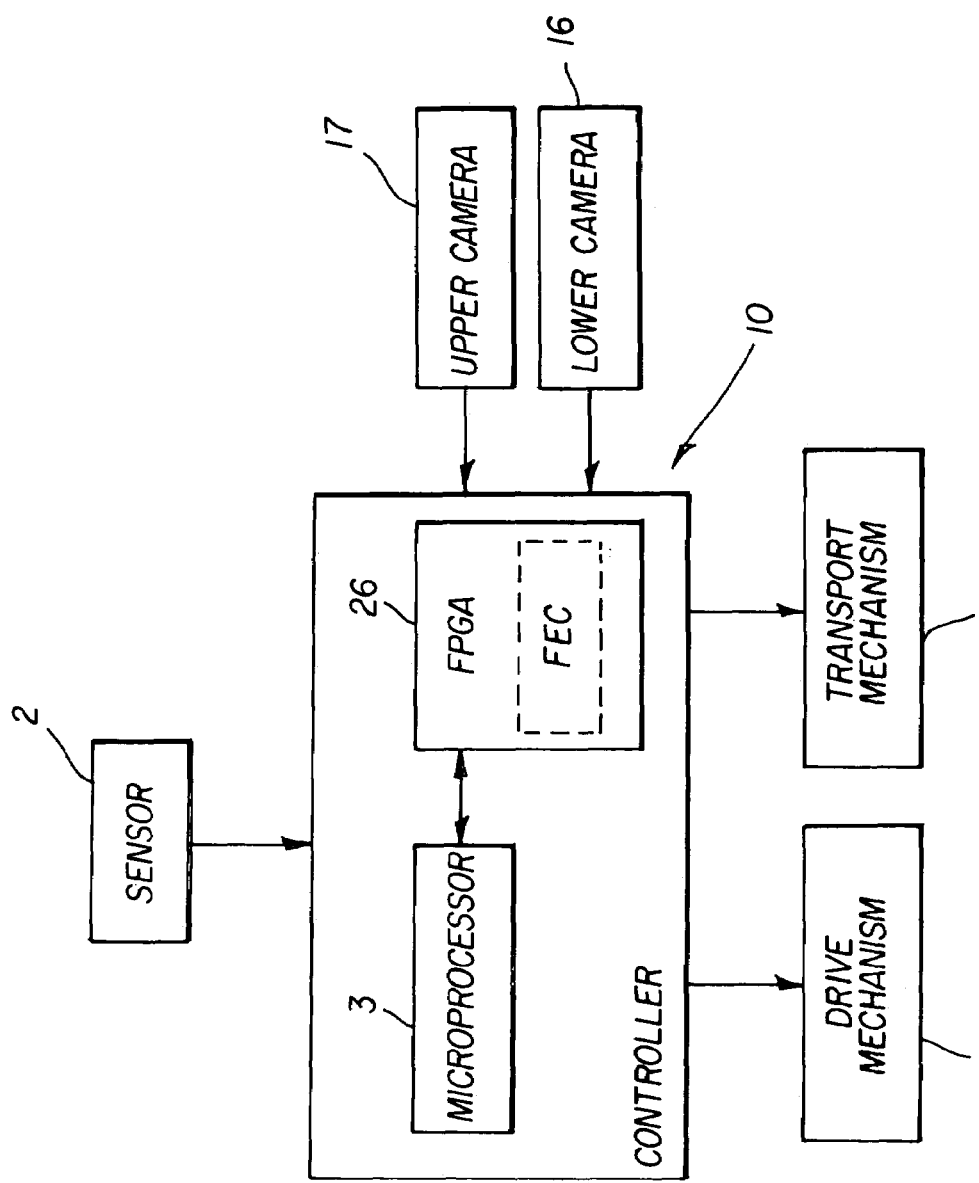
FIG. 1 is a block diagram of a controller and interfaces devices according to the present invention.
Figure 2:
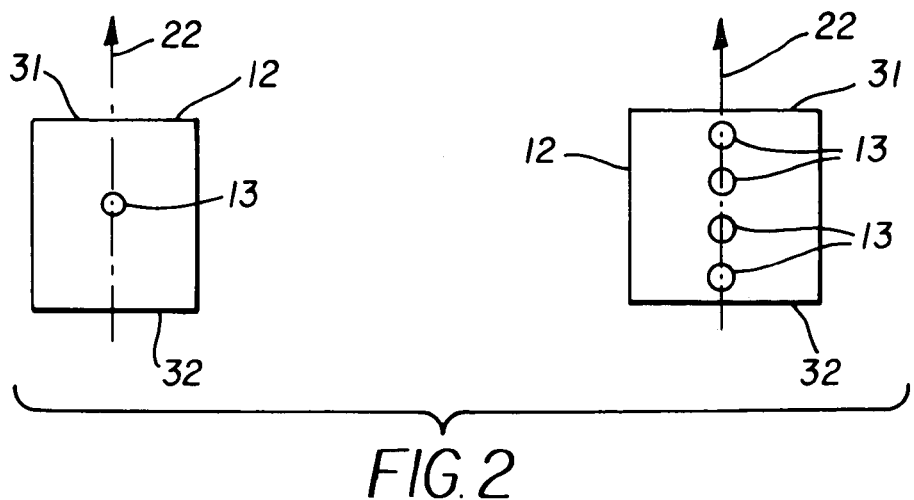
FIG. 2 shows documents with holes.

Referring now to FIG. 1, the controller 10 uses a sensor 2 and a field programmable gate array (FPGA) 26 for input, which controls the feeding, transporting, and capturing of documents 12 (shown in FIG. 2). The FPGA 26 is programmed and saves as a front-end controller (FEC). Alternately, the FPGA 26 can be replaced with an application specific integrated circuit (ASIC) programmed as the FEC. The FEC uses either the upper camera 17, or the lower camera 16, or both for input. The FEC manipulates input data from the cameras and sensors, and provides image capture control as well as page detection to the microprocessor 3. A drive mechanism 5 feeds a document 12 from the input tray 11 (shown in FIG. 6) utilizing a feeder clutch such that the transport mechanism 6, utilizing a motor control, moves the document 12 steadily past the cameras.

Specialized page detection requires the user to put the scanner in a particular mode. The camera, when used as a page detection sensor, is enabled just before a page is fed using an edge detect signal in the FEC. The ultrasonic paper sensor 2 is used as a secondary sensor and is always enabled.

Figure 5:
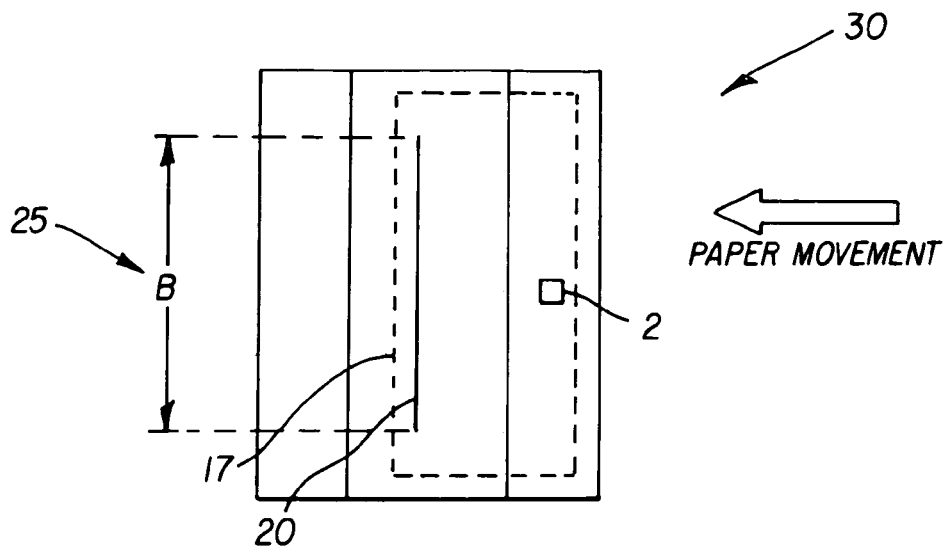
FIG. 5 shows a top view of a scanner, which includes an upper camera and an ultrasonic paper sensor.
Figure 6:
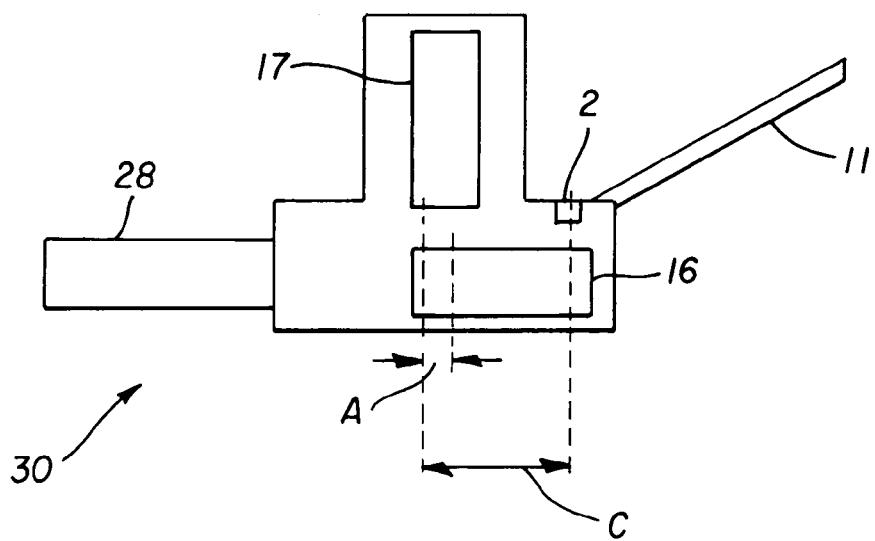
FIG. 6 show a side view of a scanner, which includes relative locations of the cameras and the ultrasonic paper sensor.

Referring to FIGS. 5 and 6, to detect the lead edge of a document 12, the controller 10 activates the transport mechanism 6 and then the drive mechanism 5 in order to feed a document 12 into the scanner 30 (shown in FIG. 6). The ultrasonic paper sensor 2 is used only to acknowledge that a document 12 is on the way and turns off the drive mechanism 5. The FEC uses the camera to detect the lead edge of a document 12 and provides the ability to start imaging when the document 12 reaches a camera location by detecting enough pixels at the proper light threshold from within the FEC. The FEC provides an interrupt to the controller 10 for each lead or trail edge detected within the camera sensor zone 20. For two sided scanning, the upper camera 17 and lower camera 16 are used independently for the detection the leading and trailing edge of the document 12 in the camera sensor zone. For one-sided scanning, only one camera is used.

Figure 3:
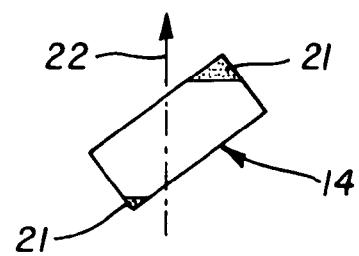
FIG. 3 shows a skewed document and the part that would be truncated by a prior art scanner.

Referring now to FIG. 3, the corner of a document, such as a check-sized document 14, is captured completely, according to the present invention. This image capture is accomplished despite a large skew angle and not traversing the sensor path 22. Without this mode, there would be a truncated image part 21 for the leading edge. To detect the trailing edge of a document 12, the camera, acting as a sensor, provides the ability to stop imaging when the document 12 is completely passed the camera location by detecting the lack of enough pixels at the proper light threshold from within the FEC. The corners 21 of a document, such as a check-sized document 14, is captured completely. Thus, the entire image of the check 14 is captured despite the skew angle of the check in the feeder path and corners of the check being missed by the signal center line sensor.

Figure 4:
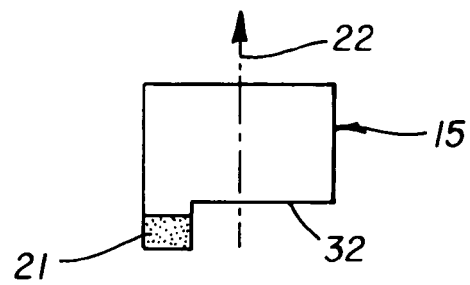
FIG. 4 shows a document with a cutout.

Referring now to FIG. 4, a cutout document 15 is captured completely, according to the present invention. Prior art scanners that did not use the camera as a both a sensor and an image capture device would miss a truncated image part 21 for trailing edge. The prior art scanners relying solely on a single center line sensor would stop image capture after trailing edge 32 had cleared sensor 2.

The camera, acting as a sensor, is enhanced to detect "activity" at the camera from within the FEC. If the image seems to be changing and active, it is still capturing a valid image. This is used to improve jam detection. If it is not active for a small amount of time, it is considered jammed. Even for a solid color document, the camera detects small amounts of activity. The sensitivity needs to be selected to balance between missed jams and false jams.

Referring now to FIG. 2, the ultrasonic paper sensor 2 is ignored if a document 12 appears to be in view of a camera as detected by the camera. The ultrasonic paper sensor 2 is ignored if a new lead edge 31 or trail edge 32 is detected while there is activity at the camera sensor 20 in order to ignore one or more holes 13 in a document 12 as shown in FIG. 2.

The ultrasonic paper sensor 2 is used for maximum length jam detection, that is, the scanner is considered jammed if the sensor 2 or the camera sensor 20 is blocked longer than the longest allowable length of the document 12. However, the camera is the primary means of determining actual length in the paper motion direction to determine if the document is jammed.

Figure 7:
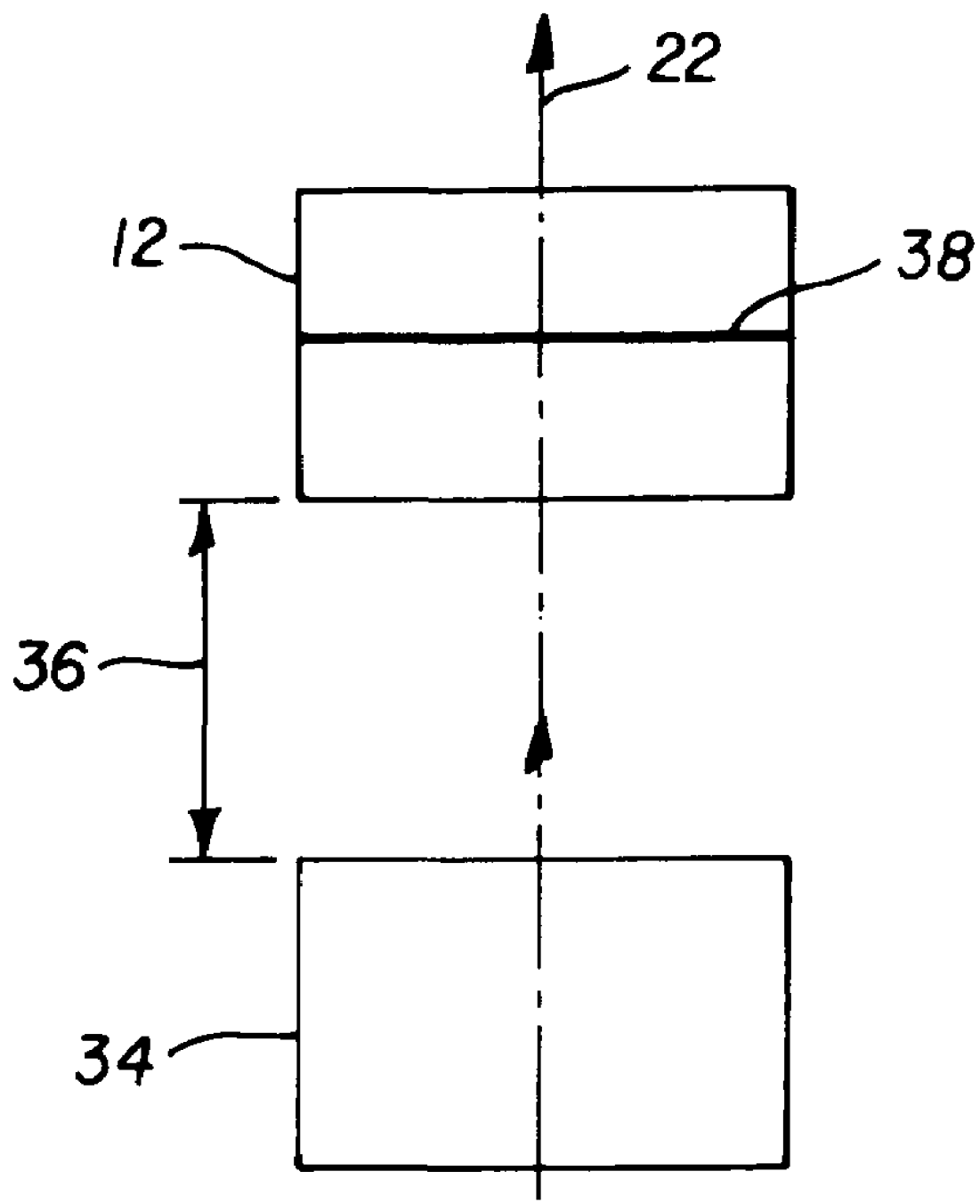
FIG. 7 shows two documents in the feed path.

A second document 34, shown in FIG. 7, is fed when the sensor 2 and the camera are cleared. This prevents overlap of with document 12 but forces a larger gap 36 between documents while in this mode.

If a document 12 has a black line 38 all the way across the width of the document 12, the camera may sense the line as the edge of the paper. In this case, the ultrasonic paper sensor 2 is used as the secondary sensor to validate the camera and avoid splitting the document 12 into multiple images.

FIG. 5 shows scanner 30 from a top view, including the approximate locations of the upper camera 17 and the sensor 2. The paper moves from right to left, as shown. The viewing width 25 corresponds to the zone 20 for which a lead and trail edge can be detected. A charged coupled device (CCD), which is used to capture an image of the document, is actually wider than the viewing width 25. The camera sensor viewing area 25 and the sensor zone are equal in the embodiment shown. In other embodiments, however, the sensor zone 20 may be less then the camera sensor viewing area 25, also called image capture area, as shown in FIG. 5.

Referring now to FIG. 6, the scanner is shown in a side view, including the approximate location of the upper camera 17, the lower camera 16, and the sensor 2. The distance between the lower camera 16 and the upper camera 17 is shown as A. The distance between the sensor 2 and the upper camera 17 is shown as C. The paper moves from the right to left and from the input tray 11 to the output tray 28. Each edge reaches the sensor 2 and then each camera sensor. When scanner 30 is used for single sided scanning agreement between sensor 2 and upper camera 17 are needed to detect the trailing edge of the document. When scanner 30 is used for duplex or double sided scanning agreement between the sensor 2, upper camera 17, and lower camera 16 are needed to ensure images are captured of both sides of the document.

The invention has been described in detail with particular reference to certain preferred embodiments thereof, but it will be understood that variations and modifications can be effected within the scope of the invention.

PARTS LIST

2. Sensor
3. Microprocessor
5. Drive mechanism (feeder)
6. Transport mechanism
10. Controller
11. Input tray
12. Document
13. Hole
14. Check-sized document, skewed
15. Cut-out document
16. Lower Camera
17. Upper Camera
20. Sensor zone
21. Truncated image part
22. Sensor Path 25. Camera sensor viewing area
26. Field programmable gate array (FPGA)
28. Output tray
30. Scanner
31. Leading edge
32. Trailing edge
34. Second document
36. Gap
38. Black line

What is claimed is:

1. A scanner comprising:
a transport mechanism for moving a document;
a sensor for detecting a leading edge and trailing edge of said document;
a camera for scanning said document, detecting a leading edge of said document, and detecting a trailing edge of said document; and
a controller which:
   1) receives a digital signal from said camera when said camera detects said document in a field of said camera;
   2) receives a signal from said sensor when said sensor detects said document in a field of said sensor;
wherein said controller:
   1) starts image capture when a leading edge of said document is detected by either said sensor or said camera, and stops image capture when a trailing edge of said document is detected by either said sensor or said camera; and
   2) turns off a drive mechanism when a leading edge of said document is detected by either said sensor or said camera, and starts a drive mechanism when a trailing edge of said document is detected by both said sensor and said camera.

2. A scanner as in claim 1 wherein image capture begins after said camera detects a specified range of pixels greater than a predetermined light level.

3. A scanner as in claim 1 wherein image capture ends after said camera detects a specified range of pixels less than a predetermined light level.

4. A scanner as in claim 1 wherein said controller comprises a microprocessor.

5. A scanner as in claim 1 wherein said controller comprises a field programmable gate array (FPGA).

6. A scanner as in claim 1 wherein said controller comprises a application specific integrated circuit (ASIC).

7. A scanner as in claim 1 wherein said controller and said camera are a single unit.

8. A scanner as in claim 1 wherein:
said controller activates said camera for image capture only during the presence of said document in said first camera field.

9. A scanner as in claim 1 wherein said scanner comprises an automatic document feeder.

10. A method of scanning a document comprising:
transporting said document past a sensor and a camera;
detecting a leading edge of said document at either said sensor or said camera;
turning off a drive mechanism when said leading edge of said document is detected;
scanning said document with said camera;
detecting a trailing edge of said document at either said sensor or said camera; and
starting said drive mechanism when said trailing edge of said document is detected,
wherein said drive mechanism is started when said trailing edge of said document is detected by said sensor and said camera.

11. A scanner for capturing an image of a document comprising:
a transport mechanism for moving said document;
a sensor for detecting a leading edge and trailing edge of said document;
a first camera for scanning a first side of said document, detecting a leading edge of said document, and detecting a trailing edge of said document; and
a controller which:
   1) receives a digital signal from said first camera when said first camera detects said document in a field of said first camera;
   2) receives a digital signal from said sensor when said sensor detects said document in a field of said sensor;
wherein said controller:
   1) starts image capture by said first camera of said first side of said document when a leading edge of said document is detected by either said sensor or said first camera, and stops image capture of said first side of said document when a trailing edge of said document is detected by either said sensor or said first camera; and
   2) turns off a drive mechanism when a leading edge of said document is detected by either said sensor or said camera, and starts a drive mechanism when a trailing edge of said document is detected by both said sensor and said camera.

12. A scanner as in claim 11 comprising:
a second camera for scanning a second side of said document, detecting said leading edge of said document, and detecting said trailing edge of said document and;
said controller:
   3) receives a digital signal from said second camera when said second camera detects said document in a field of said second camera;
wherein said controller:
   3) starts image capture by said second camera of said second side of said document when a leading edge of said document is detected by either said sensor or said second camera, and stops image capture of said second side of said document when a trailing edge of said document is detected by both said sensor and said second camera.

13. A method of scanning a document comprising:
transporting said document past a sensor;
detecting a leading edge of said document at either said sensor, a first camera, or a second camera;
turning off a drive mechanism when said leading edge of said document is detected by either said sensor, said first camera, or said second camera;
scanning a first side of said document with said first camera;
capturing an image of said first side of said document when said document is in front of said first camera;
capturing an image of said second side of said document when said document is in front of said second camera;
detected a trailing edge of said document by either said sensor, said first camera, or said second camera; and
starting said drive mechanism when said trailing edge of said document is detected by said sensor, said first camera, and said second camera.

* * * * *